US007938346B2

(12) United States Patent
Husband et al.

(10) Patent No.: US 7,938,346 B2
(45) Date of Patent: May 10, 2011

(54) GRINDING METHOD FOR INORGANIC PARTICULATE MATERIAL

(75) Inventors: John Claude Husband, St. Austell (GB); Nigel V. Jarvis, St. Austell (GB); Charles Desmond Payton, St. Austell (GB); David Robert Skuse, Truro (GB)

(73) Assignee: Imerys Minerals Limited, Par Cornwall (GB)

( * ) Notice: Subject to any disclaimer, the term of this patent is extended or adjusted under 35 U.S.C. 154(b) by 0 days.

(21) Appl. No.: 12/728,917

(22) Filed: Mar. 22, 2010

(65) Prior Publication Data

US 2010/0219269 A1    Sep. 2, 2010

Related U.S. Application Data

(63) Continuation of application No. 10/523,105, filed as application No. PCT/GB03/003970 on Sep. 12, 2003, now abandoned.

(30) Foreign Application Priority Data

Sep. 17, 2002  (GB) .................................. 0221632.3

(51) Int. Cl.
*C04B 14/00* (2006.01)
*C09C 1/02* (2006.01)
*B01F 3/12* (2006.01)

(52) U.S. Cl. .............. 241/29; 241/15; 241/16; 106/400; 106/464; 106/465; 252/387

(58) Field of Classification Search ................. 524/447, 524/425; 106/400, 484, 465, 464, 486; 241/15, 241/16, 21, 22, 29; 516/78, 79, 928; 423/430, 423/432; 252/387
See application file for complete search history.

(56) References Cited

U.S. PATENT DOCUMENTS

| | | | |
|---|---|---|---|
| 3,797,610 A | 3/1974 | Windle | |
| 3,989,195 A | 11/1976 | Falcon-Steward | |
| 4,166,582 A | 9/1979 | Falcon-Steward | |
| 4,264,372 A | 4/1981 | Graves | |
| 4,509,987 A | 4/1985 | Farrar et al. | |
| 4,793,985 A | 12/1988 | Price et al. | |
| 4,915,845 A * | 4/1990 | Leighton et al. | 210/701 |
| 5,084,254 A | 1/1992 | Golley | |
| 5,432,239 A | 7/1995 | Egraz et al. | |
| 5,533,678 A | 7/1996 | Strauch et al. | |
| 5,533,679 A | 7/1996 | Golley | |
| 5,810,998 A | 9/1998 | Arrington-Webb et al. | |
| 5,879,442 A | 3/1999 | Nishiguchi et al. | |
| 5,910,214 A | 6/1999 | You | |
| 6,003,795 A | 12/1999 | Bown et al. | |
| 6,087,404 A | 7/2000 | Bown et al. | |
| 6,143,065 A | 11/2000 | Freeman et al. | |
| 6,200,377 B1 | 3/2001 | Basilio et al. | |
| 6,315,867 B1 | 11/2001 | Skuse et al. | |
| 6,395,813 B1 | 5/2002 | Duccini et al. | |
| 6,402,824 B1 * | 6/2002 | Freeman et al. | 106/464 |
| 6,620,856 B1 | 9/2003 | Mortimer et al. | |
| 2001/0022282 A1 | 9/2001 | Nagaraj et al. | |
| 2002/0117085 A1 | 8/2002 | Wesley | |
| 2003/0045647 A1 | 3/2003 | Suau et al. | |
| 2003/0094120 A1 * | 5/2003 | Golley et al. | 106/486 |

FOREIGN PATENT DOCUMENTS

| | | |
|---|---|---|
| EP | 0 108 842 A1 | 5/1984 |
| GB | 1123219 | 8/1968 |
| GB | 1 309 074 | 3/1973 |
| GB | 1 569 969 | 6/1980 |
| GB | 1 599 632 | 10/1981 |
| GB | 2 179 956 A | 3/1987 |
| WO | WO 01/48093 A1 | 7/2001 |
| WO | WO 02/49765 A2 | 6/2002 |
| WO | WO 2006/105189 A1 | 10/2006 |

OTHER PUBLICATIONS

Hatch, G.B. and Rice, Owen, "Corrosion Control with Threshold Treatment", 32 J. Indus. Eng'g Chem. Dec. 1940, pp. 1572-1579.
International Search Report and Written Opinion for PCT Application No. PCT/GB03/03970.
Statement of Grounds of Appeal dated Aug. 23, 2010, for related EP Application No. 03750912, including Exhibits E11-E16.
Letter regarding the Opposition Procedure dated Feb. 17, 2010, for related EP Application No. 03750912, including Exhibit E-9.

* cited by examiner

*Primary Examiner* — Vasu Jagannathan
*Assistant Examiner* — Hannah Pak
(74) *Attorney, Agent, or Firm* — Finnegan, Henderson, Farabow, Garrett & Dunner, L.L.P.

(57) ABSTRACT

A method of preparing a steep particle size inorganic particulate material includes grinding an aqueous suspension of an inorganic particulate material having a solids content of less than 35% and including a sub-effective amount of a dispersant for the inorganic particulate material. The method may further include dewatering the aqueous suspension to a solids content of at least 50% and dispersing the dewatered aqueous suspension by adding an additional amount of dispersant, and wherein, after grinding, the inorganic particulate material has a steepness factor above 35.

12 Claims, 3 Drawing Sheets

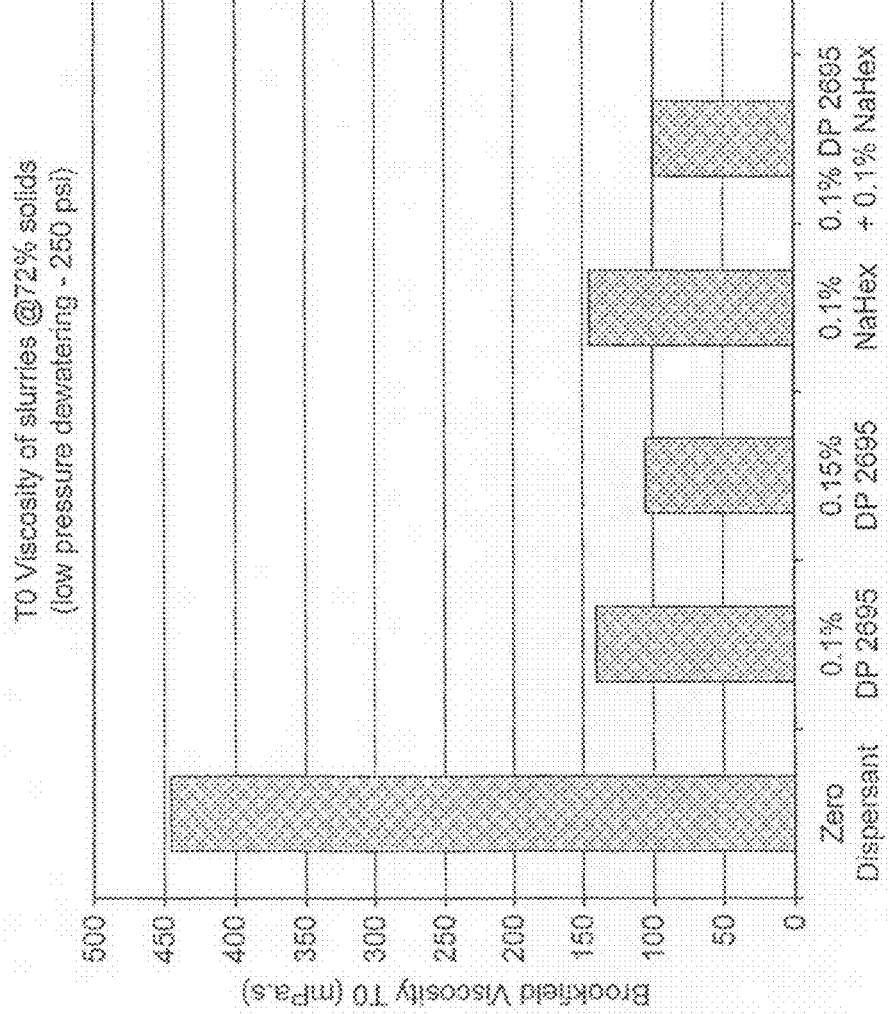

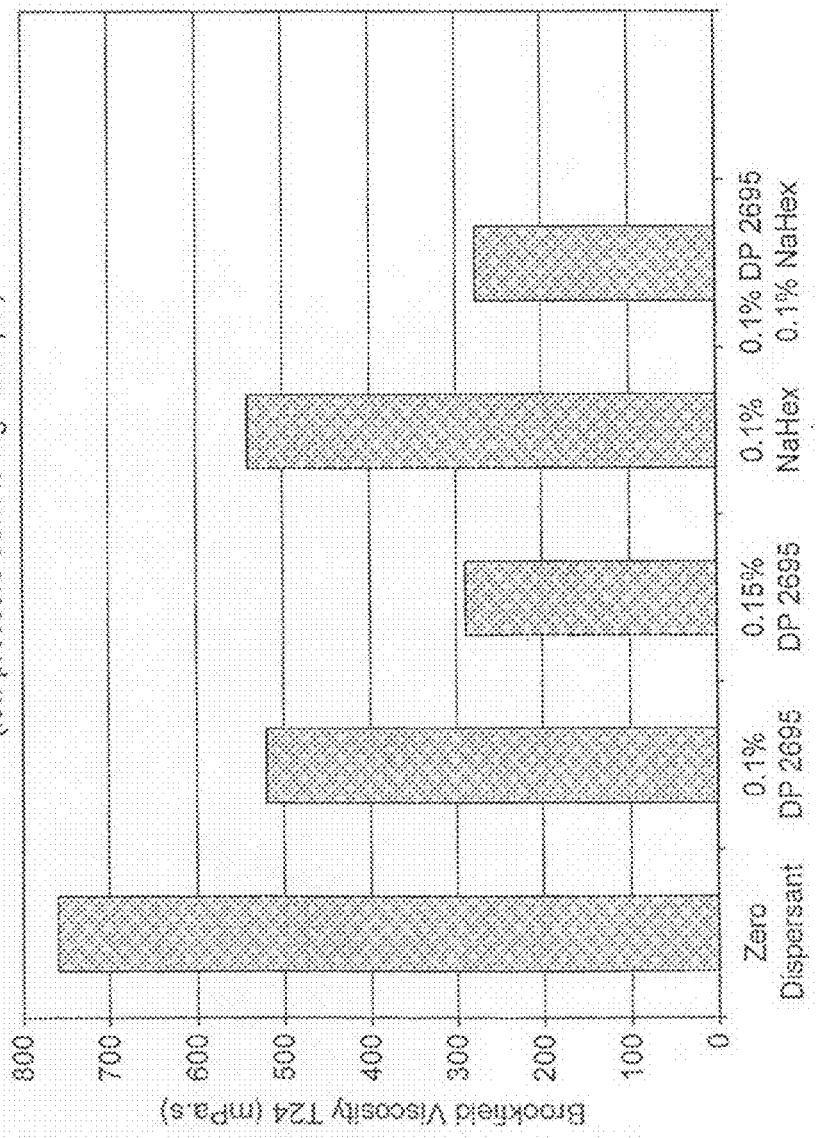

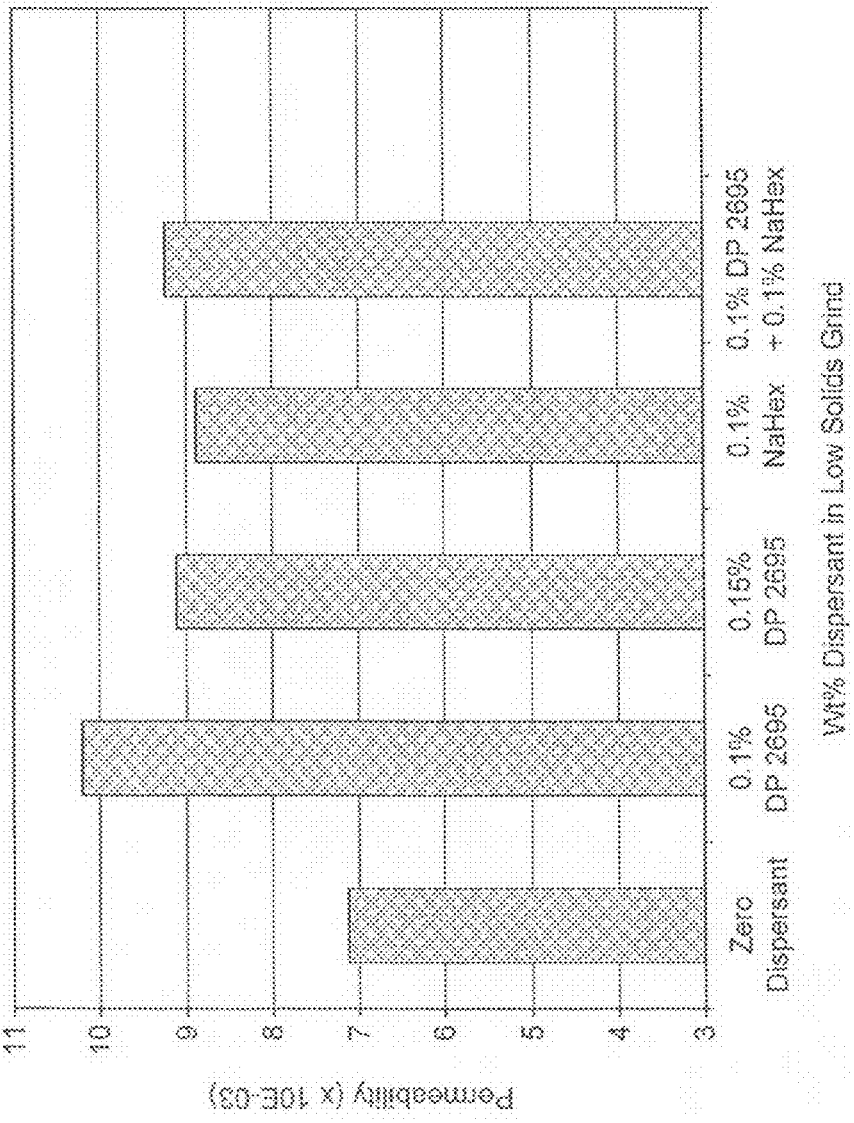

GRINDING METHOD FOR INORGANIC PARTICULATE MATERIAL

This is a continuation of U.S. application Ser. No. 10/523,105, filed Nov. 23, 2005, now abandoned which is a U.S. national phase entry under 35 U.S.C. §371 based on PCT Application No. PCT/GB03/003970, filed Sep. 12, 2003, which claims the benefit of priority of Great Britain Application No. 0221632.3 filed Sep. 17, 2002. This continuation application claims the benefit of priority of PCT/GB03/003970, and Great Britain Application No. 0221632.3, and incorporates herein by reference the subject matter of those applications.

FIELD OF THE INVENTION

This invention relates to a method of grinding an aqueous suspension of an inorganic particulate material and to product's obtained thereby.

BACKGROUND OF THE INVENTION

Aqueous suspensions containing inorganic particulate material, for example an alkaline earth metal (e.g. calcium) carbonate or kaolin, are used widely in a number of applications. These include, for example, the production of pigment or filler containing compositions which may be used in paper manufacture or paper coating, and the production of filled compositions for paints, plastics and the like.

The inorganic particulate material typically has a known particle size distribution (psd), dictated by the intended end use in ways which are well known in the art. Generally, the required psd is obtained by a method which includes grinding the inorganic particulate material in an aqueous suspension. The suspension may contain a high (e.g. above about 50% by weight) or low (e.g. below about 50% by weight) content of the inorganic particulate solids.

Where the aqueous suspension has a high solids content, it is necessary to disperse the inorganic particulate material using an effective amount of a dispersing or deflocculating agent (dispersant). High solids grinding typically produces a relatively high proportion of ultra-fine particles (e.g. having an equivalent spherical diameter smaller than about 0.25 μm). To maintain an acceptably low viscosity of the suspension, one either needs to use relatively high levels of common dispersants, or lower levels of specialized—and thus relatively expensive—dispersants.

Where the aqueous suspension has a low solids content, a dispersant can be avoided. This enables the suspension to be dewatered cost-effectively, but problems can be encountered when mixing dispersant into the suspension later.

It is often desirable to produce a product which has a "steep" psd, in the sense that a large proportion of the particles are within a narrow size range. As used herein, a "steep" psd refers to a steepness factor greater than about 35, more particularly above about 40, steepness factor being defined as the ratio of the $d_{30}$ equivalent spherical diameter (at which 30% by weight of the particles are finer) to the $d_{70}$ equivalent spherical diameter (at which 70% by weight of the particles are finer), multiplied by 100.

In order to obtain this desired steepness, it is the present practice to grind the aqueous suspension at low solids in order to minimize the formation of ultra-fine particles. It is also desirable to perform the grinding stage in the absence of any dispersant in order to maintain a flocculated or aggregated state and so facilitate subsequent flocculated dewatering. In some cases, effective amounts of specialized dispersants are added to the dewatered, relatively high solids, suspension, to minimize flocculation and provide an acceptable viscosity for handling at that stage. It is also common practice to recirculate the water removed at the dewatering stage, to dilute the fresh feed. However, a number of problems can arise. For example, there can a significant loss in brightness (discoloration) due to corrosion products (e.g. iron-based corrosion products) from the system piping and equipment. Typically brightness values can be reduced by about 2-3 ISO units lower, with yellowness values about 1-2 ISO units higher. This discoloration is probably exacerbated in the low solids method, because the recirculated water becomes relatively highly aerated. Moreover, it can be difficult to introduce the dispersants in effective amounts at the high solids stages. In addition, the use of specialized dispersants can result, in materials which may then not be compatible in mixtures with materials including conventional dispersants such as polyacrylates.

The present invention aims to go at least some way towards overcoming the above problems, or at least to provide an acceptable alternative method of grinding an aqueous suspension of an inorganic particulate material.

BRIEF DESCRIPTION OF THE INVENTION

The present invention is based on the finding that the problems referred to above can be alleviated by performing the grinding of an inorganic particulate material in an aqueous suspension which includes a very small amount of a dispersant.

In accordance with a first aspect of the present invention, there is provided a method of grinding an inorganic particulate material in an aqueous suspension, wherein the said aqueous suspension includes a sub-effective amount of a dispersant for the inorganic particulate material. The term "sub-effective" means that the dispersant is present in a finite amount, but that amount is not sufficient to give rise to deflocculation of the particulate inorganic material, so that the flocculation characteristics of the suspension are substantially the same as would be found in the complete absence of any dispersant. Such an amount of the dispersant may typically be up to about 0.25% by weight, based on the weight of dry inorganic particulate, for example up to about 0.15% by weight, e.g. up to about 0.1% by weight.

In accordance with a second aspect of the present invention, there is provided a method of grinding an aqueous suspension of a particulate inorganic material to obtain a particulate inorganic material of reduced particle size and increased steepness, wherein the grinding is carried out in the presence in the aqueous suspension of a sub-effective amount of a dispersant for the inorganic particulate material.

The method may, for example, be used in the grinding of an inorganic particulate material at a low solids level in the suspension, e.g. the amount of the inorganic particulate solids being less than about 50% by weight, based on the total weight of the suspension.

The method preferably further comprises grinding the inorganic particulate material udder grinding conditions such as to raise the steepness of the inorganic particulate material to a steepness factor above about 35, more particularly above about 40, for example above about 45.

The method preferably further comprises dewatering the aqueous suspension to raise the solids content thereof more preferably to a content of inorganic particulate material above about 50% by weight, based on the total weight of the suspension.

In accordance with a third aspect of the present invention, there is provided an aqueous suspension of a ground particulate inorganic material comprising a sub-effective amount of a dispersant for the inorganic particulate material. The aqueous suspension may suitably be prepared by a grinding method according to the first or second aspect of the present invention. The particulate inorganic material suitably has a steepness factor above about 35, more particularly above about 40, for example above about 45. The dispersant is suitably present in the aqueous suspension in an amount up to about 0.25% by weight, based on the weight of dry inorganic particulate, for example up to about 0.15% by weight, e.g. up to about 0.1% by weight. The aqueous suspension may be at a high or low solids content.

In accordance with a fourth aspect of the present invention, there is provided an aqueous suspension of a ground inorganic particulate material comprising a dispersant-effective amount of a dispersant for the inorganic particulate material, when prepared by a method according to the first or second aspect of the present invention and which includes the addition, after grinding, of as amount of a dispersant to the aqueous suspension.

In accordance with a fifth aspect of the present invention, there is provided a dry ground inorganic particulate material comprising an amount of a dispersant for the inorganic particulate material, the material being the dry residue of an aqueous suspension according to the third or fourth aspect of the present invention.

In accordance with a sixth aspect of the present invention, there is provided the use of a sub-effective amount of a dispersant as a corrosion inhibitor in a low solids aqueous suspension of an inorganic particulate material.

DETAILED DESCRIPTION OF THE INVENTION

The Inorganic Particulate Material

The inorganic particulate material may, for example, be an alkaline earth metal carbonate such as calcium carbonate, a hydrous kandite clay such as kaolin or ball day, an anhydrous (calcined) kandite clay such as metakaolin or fully calcined kaolin, wollanstonite, bauxite, talc, mica, titanium dioxide, silicon dioxide or carbon.

The preferred inorganic particulate material for use in the present invention is calcium carbonate.

The particle size distribution (psd) of the inorganic particulate material after grinding is suitably such that at least about 80% by weight of the calcium carbonate particles have an equivalent spherical diameter less than 2 µm, at least about 50% by weight of the particles have an equivalent spherical diameter less than 1 µm, at least about 20% by weight of the particles have an equivalent spherical diameter less than 0.5 µm, and less than about 20% by weight of the particles have an equivalent spherical diameter less than 0.25 µm. For example, at least about 92% by weight of the particles may suitably have an equivalent spherical diameter less than 2 µm, at least about 70% by weight of the particles may have an equivalent spherical diameter less than 1 µm, at least about 30% by weight of the particles may have an equivalent spherical diameter less than 0.5 µm, and less than about 15% by weight of the particles may have an equivalent spherical diameter less than 0.25 µm. The particles may suitably be calcium carbonate. The mean (average) equivalent particle diameter ($d_{50}$ value) of the particulate calcium carbonate after grinding may suitably be in the range about 0.4 to about 1.2 µm, for example in the range about 0.4 to about 1.0 µm.

The moan (average) equivalent particle diameter ($d_{50}$ value) and other particle size properties referred to herein for the inorganic particulate materials are as measured by sedimentation of the particulate material in a fully dispersed condition in an aqueous medium using a Micromeritics Sedigraph 5100 unit. The mean equivalent particle size $d_{50}$ is the value determined in this way of the particle esd at which there are 50% by weight of the particles which have an equivalent spherical diameter less than that $d_{50}$ value.

The Dispersant

The dispersant is a chemical additive capable, at a sufficient amount greater than the amount to be used in the present invention, of acting on the particles of the inorganic material to prevent or effectively restrict flocculation or agglomeration of the particles to a desired extent, according to the normal processing requirements. At the levels used in the present invention, however, the dispersant is not effective in this way, although it serves the useful and expected result of assisting to alleviate the problems noted in relation to the prior art, particularly one or more of: reduction in discoloration of the particulate material; improvement of introduction of dispersants in effective amounts at the high solids stages; improvement of compatibility of the particulate material in mixtures with other particulate materials including conventional dispersants such as polyacrylates.

The dispersant may, for example, be selected from conventional dispersant materials commonly used in the processing and grinding of inorganic particulate materials. Such dispersants will be well recognised by those skilled in this art. They are generally water-soluble salts capable of supplying anionic species which in their effective amounts can adsorb on the surface of the inorganic particles and thereby inhibit aggregation of the particles. The unsolvated salts suitably include alkali metal cations such as sodium. Solvation may in some cases be assisted by making the aqueous suspension slightly alkaline. Examples of suitable dispersants include: water soluble condensed phosphates, e.g. polymetaphosphate salts [general form of the sodium salts: $(NaPO_3)_x$] such as tetrasodium metaphosphate or so-called "sodium hexametaphosphate" (Graham's salt); water-soluble salts of polysilicic acids; polyelectrolytes; salts of homopolymers or copolymers of acrylic acid or methacrylic acid, or salts of polymers of other derivatives of acrylic acid, suitably having a weight average molecular mass of less than about 20,000. Sodium hexametaphosphate and sodium polyacrylate, the latter suitably having a weight average molecular mass in the range of about 1,500 to about 10,000, are especially preferred.

The Aqueous Suspension

The method of the present invention is preferably carried out on an aqueous suspension which comprises up to 35% by weight of the inorganic particulate material, typically of the order of 20-30% by weight.

The amount of dispersant used in the method is preferably less than about 0.25% by weight; more preferably less than 0.15% by weight, typically less than about 0.1% by weight, based on the weight of dry inorganic particulate. However, the precise amounts may be varied easily by those skilled in the art, to achieve the effect provided by the present invention.

The aqueous suspension may suitably be prepared by conventional mixing techniques, and may suitably include optional additional components, as will be well appreciated and understood by those skilled in this art.

The Grinding Method

The grinding is suitably performed in conventional manner. The grinding may be an attrition grinding process in the presence of a particulate grinding medium, or may be an autogenous grinding process, i.e. one in the absence of a grinding medium.

The particulate grinding medium, when present, may be of a natural or a synthetic material. The grinding medium may, for example, comprise balls, beads or pellets of any hard mineral, ceramic or metallic material; such materials may include, for example, alumina, zirconia, zirconium, silicate, aluminium silicate or the mullite-rich material which is produced by calcining kaolinitic clay at a temperature in the range of from about 1300° C. to about 1800° C. Alternatively, particles of natural sand of a suitable particle size may be used.

Generally, the type of and particle size of grinding medium to be selected for use in the invention may be dependent on the properties, such as, e.g. the particle size of, and the chemical composition of, the feed suspension of inorganic material to be ground. Preferably, the particulate grinding medium comprises particles having an average diameter in the range of from about 0.1 mm to about 6.0 mm and, more preferably in the range of from about 0.2 mm to about 4.0 mm. The grinding medium (or media) may be present in an amount of from about 40% to about 70% by volume of the charge; and, more preferably in an amount from about 50% to about 60% by volume of the charge.

The grinding may be carried out in one or more stages. For example, the feed suspension may be partially ground in a first attrition grinder, the suspension of partially ground inorganic particulate material then being fed to a second attrition grinder for further grinding, after which the suspension of ground material may be fed to one or more subsequent attrition grinders.

The grinding process may, for example, be conducted at a relatively low temperature, e.g. below about 30° C. Lower temperatures are believed to assist in preventing or restricting discoloration of white inorganic particulates resulting from iron-based corrosion products entering the aqueous suspension.

After the grinding has been carried out, the suspension may be dewatered to a high solids suspension, and any grinding medium removed. Thereafter the ground product may be dried.

A high solids suspension formed by said dewatering may suitably have a solids level of the order of 70% by weight, and be formed using a dispersing agent, such as one of the dispersing agents mentioned above. The dispersing agent used may or may not be the same as that used in the grinding step. However, the dispersing agent used at the post-grinding stage will be required to restrict flocculation of the particulate inorganic material in the high solids suspension, and must therefore be present in a dispersant-effective amount, typically at least about 0.3% by weight of dry inorganic particulate, more preferably at least about 0.4% by weight, for example at least about 0.5% by weight.

Without limitation on the scope of the invention, it is theorised that the very small amount of dispersant used in accordance with the present invention is sufficient to "pre-coat" the inorganic particulate material, allowing more even distribution of the larger amounts of dispersant added later to make a high solids slurry. In addition, it is believed that the small amounts of dispersant used serve as a corrosion inhibitor during the grinding process.

Uses of the Ground Particulate Material

The ground particulate material obtained using the method of the present invention maybe used in a wide variety of applications, as will be readily apparent to one of ordinary skill in this art. Usually, the inorganic particulate material is present as a coating or filler, or as part of a coating or filler composition. The applications include, for example, the preparation of: paper (which term includes within its scope all forms of paper, card, board, cardboard and the like, including without limitation printing paper and writing paper); polymers and rubbers, e.g. plastics (which may be in the form of a film); paints; sealants and mastics; ceramics; as well as compositions which are subsequently processed to obtain any of the above.

BRIEF DESCRIPTION OF THE DRAWINGS AND EXAMPLES

The invention will now be described in greater detail, but without limitation, with reference to Examples and to the accompanying drawings. In the drawings:

FIG. 1 shows the slurry viscosities obtained at T=0 using the dispersants of the experiment of Example 2;

FIG. 2 shows the slurry viscosities obtained at T=24 hours using the dispersants of the experiment of Example 2; and FIG. 3 shows the permeability of the slurries obtained using the dispersants of the experiment of Example 2, under low pressure piston press dewatering.

EXAMPLE 1

In this experiment, the effect of various starvation (very low) doses of sodium hexametaphosphate dispersant on the slurry properties of ground calcium carbonate was measured.

Ground calcium carbonate was prepared by laboratory slurry sandgrinding at 250 kWh/t at low solids (25 weight-%) from a coarse calcium carbonate feed. Three batches of sand-ground material were prepared containing, respectively, dispersant at 0.1%, 0.2% and 0.3% by weight of dry calcium carbonate. The three batches were then dewatered by low pressure piston pressing at 250 psi, to obtain a cake. The permeability and resistance of the cake was measured during pressing in each case, using the test methods described below. Each of the three cakes was then divided into two samples and the cake samples suspended (slurry makedown) using 0.5% and 0.6% partially neutralised sodium polyacrylate dispersant solution (60% neutralisation), to obtain high solids slurries at 72-73 weight-% solids. Brookfield 100 rpm viscosities of the slurry were then measured at T (time after makedown)=0, 1, 24 and 168 hrs. In addition, the psd, $d_{50}$ and steepness were measured for each sample after pressing.

The results for the six samples (numbered 1 to 6) and a corresponding control (no dispersant used) are shown in Table 1 below.

TABLE 1

| Sample | Sedigraph (wt %) | | | | | | Steepness | Permeability ×$10^{-3}$ | Resistance ×$10^{15}$ | Brookfield Viscosity (mPa·s) | | |
| | <2 μm | <1 μm | <0.75 μm | <0.5 μm | <0.25 μm | d50 μm | | | | T = 0 | T = 1 | T = 24 |
| --- | --- | --- | --- | --- | --- | --- | --- | --- | --- | --- | --- | --- |
| Control | 95 | 66 | | 33 | 15 | | 45 | 7.114 | 4.74 | 525 | 660 | 760 |
| 1 | 98 | 75 | 58 | 36 | 15 | 0.61 | 46 | 8.64 | 3.9 | 121 | 242 | 372 |

TABLE 1-continued

| | Sedigraph (wt %) | | | | | | | | Brookfield Viscosity (mPa · s) | | |
|---|---|---|---|---|---|---|---|---|---|---|---|
| | <2 | <1 | <0.75 | <0.5 | <0.25 | d50 | | Permeabil- | Resis- | | |
| Sample | μm | μm | μm | μm | μm | μm | Steepness | ity ×10$^{-3}$ | tance ×10$^{15}$ | T = 0 | T = 1 | T = 24 |
| 2 | 99 | 78 | 61 | 38 | 16 | 0.58 | 47 | 9.70 | 3.48 | 159 | 375 | 673 |
| 3 | 99 | 76 | 60 | 38 | 16 | 0.59 | 47 | 9.39 | 3.59 | 92 | 163 | 300 |
| 4 | 98 | 73 | 57 | 35 | 15 | 0.62 | 46 | 10.01 | 3.37 | 113 | 259 | 408 |
| 5 | 99 | 76 | 59 | 38 | 17 | 0.59 | 46 | 7.47 | 4.52 | 95 | 148 | 260 |
| 6 | 98 | 75 | 59 | 37 | 17 | 0.6 | 45 | 5.52 | 6.11 | 144 | 411 | 696 |

1 "0.1% Calgon/0.5% Part Neutralised Polyacrylate Dispersant"
2 "0.1% Calgon/0.6% Part Neutralised Polyacrylate Dispersant"
3 "0.2% Calgon/0.5% Part Neutralised Polyacrylate Dispersant"
4 "0.2% Calgon/0.6% Part Neutralised Polyacrylate Dispersant"
5 "0.3% Calgon/0.5% Part Neutralised Polyacrylate Dispersant"
6 "0.3% Calgon/0.6% Part Neutralised Polyacrylate Dispersant"

Permeability Test Method

The permeability of the filter cake was measured under the standard test procedure, the permeability being expressed in Table 1 as a number equivalent to the flow of water at 15° C. that would be attained in cubic inches (1 cubic inch=1.638× 10$^{-5}$ cubic meters) per hour through a cake of one square inch area (1 square inch=6.451×10$^{-4}$ square meters) and one inch thickness (1 inch=2.54 cm) under a pressure differential of one pound force per square inch (6.895 kPa).

Resistance Test Method

The filter cake resistance (α) was measured under the standard test procedure, and is expressed in Table 1 as the conventional function of the pressure drop across the accumulated cake in pounds force per square foot (1 pound force per square foot=47.90 Pa).

Discussion and Conclusions

Samples 1, 2, 3 and 4 gave the best permeability/resistance in dewatering, suggesting that a dispersant dose greater than 0.2% at the grinding stage is detrimental to the product's dewatering properties. Note that a high permeability implies faster filtration rate Samples 1, 3 and 5 showed the least structure formation, suggesting that a dose of 0.5% partially neutralised dispersant at the makedown stage is optimum.

The data suggest that optimum dispersant dose for the pre-grind is 0.1-0.2% dispersant with 0.5% of 60% partially neutralised dispersant as the post-grind dose.

EXAMPLE 2

In this experiment, the effect of various starvation (very low) pre-grind doses of the dispersants sodium hexametaphosphate (NaHex), sodium polyacrylate DP2695 (available from Ciba Chemicals) and combinations thereof on the slurry properties of ground calcium carbonate was measured.

The method was essentially that described above for Example 1, but using different dispersants, as shown in FIGS. 1 to 3 of the drawings, and with a total dose of added-dispersant equal to 0.6%.

Discussion and Conclusions

The results of the T=0 and T=24 hours Brookfield 100 rpm viscosity measurements on the 72% solids slurry obtained after makedown are illustrated in FIGS. 1 and 2. The results of the cake permeability measurements on low pressure piston pressing at 25 weight-% solids are shown in FIG. 3.

The results in FIG. 1 show that a pre-grind dose of 0.1% and 0.15% sodium polyacrylate gave good T=0 viscosity. However, all the slurries treated with a starvation dose of dispersant were better than the control. The combined pre-grind dose of sodium polyacrylate and sodium hexametaphosphate, and the pre-grind dose of 0.15% sodium polyacrylate, gave the best T=0 viscosity results.

The results in FIG. 2 show that a pre-grind dose of 0.15% BTC2 gave better T=24 hours viscosity than the control. The combined pre-grind dose of BTC2 and sodium hexametaphosphate, and the pre-grind dose of 0.15% sodium polyacrylate, gave the best T=24 hours viscosity results.

The results in FIG. 3 show that all the samples gave higher permeabilities than the control. The pre-grind dose of 0.1% sodium polyacrylate and the combined pre-grind dose of sodium hexametaphosphate and 0.1% sodium polyacrylate gave the best permeability results.

EXAMPLE 3

In this Example, the effect of adding sodium hexametaphosphate on the brightness of ground calcium carbonate slurries was measured.

Experimental

Samples, of two ground calcium carbonates A and B were used, having respective psd as follows: A—99% by weight less than 2 μm, 90% by weight less than 1 μm, 70% by weight less than 0.5 μm, 35% by weight less than 0.25 μm; B—95% by weight less than 2 μm, 75% by weight less than 1 μm, 40% by weight less than 0.5 μm, 15% by weight less than 0.25 μm. Each carbonate sample was split into two portions and each portion was diluted to provide about 30 and 20 wt % solids suspensions (slurries) of carbonates A and B. To samples of each suspension, 200 ppm of powdered iron was added and to selected ones of those samples 0.1% sodium hexametaphosphate was added (see Table 2). Oxygen was applied to selected slurry samples for 30 minutes at about 10 l/min per sample at temperatures of 22° C. and 50° C. Following treatment, the samples were flocculated with calcium chloride, filtered, and dried for brightness measurement. Brightness and yellowness were measured by the ISO methods immediately after treatment (T=0 hours) and also after 1 week (T=168 hours). The results are shown in Table 2 below. The first part of Table 2 shows the results at T=0 hours, and the second part of Table 2 shows the results at T=168 hours.

TABLE 2

T = 0 data

| Sample | Solids wt % | Iron add'n (ppm) | temp ° C. | O2 addition l/min | NaHex add'n wt % | ISO B'ness | ISO Y'ness | L | A | B |
|---|---|---|---|---|---|---|---|---|---|---|
| A | 30% | | | | 0 | 93.1 | 0.8 | 97.5 | 0 | 0.46 |
| | | 200 ppm | 22 | | 0 | 91.8 | 1 | 97.2 | 0 | 0.76 |
| | | 200 ppm | 50 | | 0 | 92 | 1 | 97.1 | −0.02 | 0.62 |
| | | 200 ppm | 22 | 10 | 0 | 91.4 | 1.4 | 97.1 | 0.03 | 0.87 |
| | | 200 ppm | 50 | 10 | 0 | 90.2 | 2 | 96.7 | 0.08 | 1.23 |
| | | 200 ppm | 22 | 10 | 0.1 | 91.9 | 0.8 | 97.1 | −0.05 | 0.61 |
| | | 200 ppm | 50 | 10 | 0.1 | 92.8 | 0.8 | 97.4 | −0.05 | 0.56 |
| | | 200 ppm | 22 | | 0.1 | 91.8 | 1 | 96.9 | −0.02 | 0.66 |
| | | 200 ppm | 50 | | 0.1 | 92.2 | 1 | 97.2 | −0.02 | 0.62 |
| B | 20 | | | | | 92.2 | 2.2 | 97.6 | 0.14 | 1.31 |
| | | 200 ppm | 22 | | | 91.5 | 2.4 | 97.4 | 0.15 | 1.45 |
| | | 200 ppm | 50 | | | 91.8 | 2.4 | 97.5 | 0.15 | 1.45 |
| | | 200 ppm | 22 | | 0.1 | 92.3 | 2.2 | 97.6 | 0.12 | 1.31 |
| | | 200 ppm | 50 | | 0.1 | 92.7 | 2.2 | 97.8 | | 1.29 |
| | | 200 ppm | 22 | 10 | | 92 | 2.4 | 97.6 | 0.12 | 1.4 |
| | | 200 ppm | 50 | 10 | | 90.7 | 2.9 | 97.2 | 0.23 | 1.75 |
| | | 200 ppm | 22 | 10 | 0.1 | 92 | 2.2 | 97.5 | 0.12 | 1.31 |
| | | 200 ppm | 50 | 10 | 0.1 | 92.2 | 2.1 | 97.6 | 0.13 | 1.25 |

T = 168 data

| Sample | Solids wt % | Iron add'n (ppm) | temp ° C. | O2 addition l/min | NaHex add'n wt % | ISO B'ness | ISO y'ness | L | A | B |
|---|---|---|---|---|---|---|---|---|---|---|
| A | 30% | | | | 0 | 93.1 | 0.8 | 97.5 | 0 | 0.46 |
| | | 200 ppm | 22 | | 0 | 92.5 | 1 | 97.4 | 0 | 0.68 |
| | | 200 ppm | 50 | | 0 | 92.5 | 1.1 | 97.4 | 0.02 | 0.72 |
| | | 200 ppm | 22 | 10 | 0 | 92.2 | 1.4 | 97.3 | 0.03 | 0.82 |
| | | 200 ppm | 50 | 10 | 0 | 90.5 | 2.2 | 96.9 | 0.1 | 1.35 |
| | | 200 ppm | 22 | 10 | 0.1 | 92.2 | 1.2 | 97.3 | 0.01 | 0.74 |
| | | 200 ppm | 50 | 10 | 0.1 | 92.7 | 1.2 | 97.5 | 0.02 | 0.73 |
| | | 200 ppm | 22 | | 0.1 | 92 | 1.2 | 97.3 | 0.01 | 0.74 |
| | | 200 ppm | 50 | | 0.1 | 92.7 | 1.2 | 97.5 | 0.02 | 0.73 |
| B | 20 | | | | | 92.2 | 2.2 | 97.6 | 0.14 | 1.31 |
| | | 200 ppm | 22 | | | 91.7 | 2.3 | 97.4 | 0.15 | 1.35 |
| | | 200 ppm | 50 | | | 91 | 2.6 | 97.2 | 0.28 | 1.54 |
| | | 200 ppm | 22 | | 0.1 | 92.6 | 2 | 97.7 | 0.12 | 1.18 |
| | | 200 ppm | 50 | | 0.1 | 92.4 | 2.1 | 97.7 | 0.13 | 1.27 |
| | | 200 ppm | 22 | 10 | | 91.3 | 2.6 | 97.4 | 0.23 | 1.53 |
| | | 200 ppm | 50 | 10 | | 90.3 | 2.9 | 97.1 | 0.26 | 1.74 |
| | | 200 ppm | 22 | 10 | 0.1 | 92.5 | 2.1 | 97.7 | 0.12 | 1.23 |
| | | 200 ppm | 50 | 10 | 0.1 | 92.5 | 2.2 | 97.7 | 0.11 | 1.3 |

Discussion and Conclusions

The results show that the initial addition of powdered iron reduces the brightness by about 1 ISO unit. The yellowness values have not been significantly affected. L (whiteness), A (blue/green) and B (yellow/orange) values from the ISO test method indicate a slight shift from blue/green to yellow. The application of oxygen at 22° C. has lowered brightness by about 0.3-0.5 units for the material A. The sample B was unchanged. At 50° C. both the brightness and yellowness for both materials A and B were significantly affected. Brightness values have been reduced by about 1.5-2.5 units with yellowness values rising by about 1 unit. LAB values indicate a shift from the blue/green to red/yellow.

Adding 0.1% sodium hexametaphosphate before oxygen addition had a major effect on the brightness for samples prepared at 50° C. Compared to the results for material prepared without sodium hexametaphosphate, the brightness is about 2 units higher with corresponding lower yellowness factors.

These results suggest that the addition of sodium hexametaphosphate may have inhibited the, corrosion that would otherwise have affected the brightness of the slurry. Temperature appears to have a significant effect on the formation of the coloured material with the results for samples prepared at 50° C. having much lower brightness than material prepared at 22° C. Samples left for 1 week (T=168 hours) show a similar trend suggesting that temperature has a greater affect than time (for this short period). Simples treated with sodium, hexametaphosphate have given similar brightness/yellowness values to the untreated material.

The foregoing broadly describes the present invention, without limitation. Variations and modifications as will be readily apparent to those of ordinary skill in this art are intended to be within the scope of this application and any resultant patents.

The invention claimed is:

1. A method of preparing a steep particle size inorganic particulate material, comprising:
    grinding an aqueous suspension of an inorganic particulate material having a solids content of less than 35% and including a sub-effective amount of a first dispersant for the inorganic particulate material, wherein the aqueous suspension includes 0.1 to 0.25% by weight of the first dispersant, based on the dry weight of the inorganic particulate material;
    dewatering the aqueous suspension to a solids content of at least 50%;
    dispersing the dewatered aqueous suspension by adding an additional amount of the first dispersant or a second dispersant; and wherein, after grinding, the inorganic particulate material has a steepness factor greater than 35.

2. A method according to claim 1, wherein the inorganic particulate material is calcium carbonate.

3. A method according to claim 1, wherein the inorganic particulate material is kaolin.

4. A method according to claim 1, wherein the first dispersant, the second dispersant, or both comprise a polyacrylate.

5. A method according to claim 1, wherein the first dispersant, the second dispersant, or both comprise a polymetaphosphate.

6. A method according to claim 5, wherein the polymetaphosphate is sodium hexametaphosphate or tetrasodium metaphosphate.

7. A method according to claim 1, wherein the aqueous suspension has a solids content ranging from 20% to 30% by weight of the inorganic particulate material.

8. A method according to claim 1, wherein, after grinding, the inorganic particulate material has a steepness factor greater than 40.

9. A method according to claim 1, wherein, after grinding, the inorganic particulate material has a steepness factor greater than 45.

10. A method according to claim 1, wherein the resultant ground inorganic particulate material is dried after treatment.

11. A method according to claim 1, wherein the resultant ground inorganic particulate material is added to a paper or paper pulp to provide a coating or filler therefore, or to a composition which is subsequently processed to obtain a paper.

12. A method according to claim 1, wherein the sub-effective amount of the first dispersant also acts as a corrosion inhibitor in the aqueous suspension of the particulate inorganic material.

* * * * *